(12) United States Patent
Hlond et al.

(10) Patent No.: US 9,678,529 B2
(45) Date of Patent: Jun. 13, 2017

(54) EFFICIENCY-BASED CLOCK FREQUENCY ADJUSTMENT

(71) Applicant: Nvidia Corporation, Santa Clara, CA (US)

(72) Inventors: Marcin Hlond, Bristol (GB); Peter Cumming, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 359 days.

(21) Appl. No.: 14/475,139

(22) Filed: Sep. 2, 2014

(65) Prior Publication Data

US 2016/0062390 A1   Mar. 3, 2016

(51) Int. Cl.
| | |
|---|---|
| G06F 1/00 | (2006.01) |
| G06F 1/08 | (2006.01) |
| G06F 1/32 | (2006.01) |

(52) U.S. Cl.
CPC ........... *G06F 1/08* (2013.01); *G06F 1/324* (2013.01); *G06F 1/3228* (2013.01); *Y02B 60/1217* (2013.01)

(58) Field of Classification Search
None
See application file for complete search history.

(56) References Cited

U.S. PATENT DOCUMENTS

| | | | |
|---|---|---|---|
| 6,298,448 B1 | 10/2001 | Shaffer et al. | |
| 8,412,969 B2 | 4/2013 | Hsiao | |
| 8,656,150 B2 | 2/2014 | Huang et al. | |
| 2002/0099964 A1 | 7/2002 | Zdravkovic | |
| 2005/0102560 A1* | 5/2005 | Taketoshi | G06F 1/3203 714/14 |
| 2005/0283629 A1* | 12/2005 | Tanaka | G06F 1/04 713/322 |
| 2009/0049314 A1* | 2/2009 | Taha | G06F 1/3203 713/300 |
| 2012/0011377 A1* | 1/2012 | Yu | G06F 1/206 713/300 |
| 2013/0124891 A1* | 5/2013 | Donaldson | G06F 1/163 713/322 |

FOREIGN PATENT DOCUMENTS

| | | |
|---|---|---|
| TW | 2010039092 A | 11/2010 |
| TW | 201122759 A | 7/2011 |

\* cited by examiner

*Primary Examiner* — Nitin Patel
(74) *Attorney, Agent, or Firm* — Kevin Brown; Parker Justiss, P.C.

(57) ABSTRACT

One aspect of the disclosure provides a computer system. In one embodiment, the computer system comprises a clock generator, at least one processor, and a clock frequency controller. The clock generator is configured to provide a clock signal at a clock frequency. The at least one processor is configured to receive the clock signal and to operate at a speed dependent on the clock frequency. The clock frequency controller is configured to receive efficiency information indicating a current efficiency of the at least one processor. The clock frequency controller is further configured to receive a request from the processor for a target number of processor instructions to be handled in a particular time period. The clock frequency controller is further configured to output a frequency control signal to the clock generator for controlling the clock frequency in dependence thereon.

19 Claims, 4 Drawing Sheets

EFFICIENCY-BASED CLOCK FREQUENCY ADJUSTMENT

TECHNICAL FIELD

This application relates to a computer system with adjustable clock frequency.

BACKGROUND

Many computer systems have multiple processors arranged to execute instructions. Each processor is arranged to receive a clock signal, and to set its operating frequency in dependence thereon. In other words, the frequency of processing cycles within the processor is set in dependence on the frequency of the clock signal. Commonly, the operating frequency of the processor equals the frequency of the clock signal. The operating frequency determines how quickly that processor processes an instruction. The higher the frequency of the clock signal input to the processor, the faster the instructions will be executed by the processor in real-time.

Processing cycles can be spent on both useful work such as, for example, instruction execution, intentional idle, and on non-useful work such as, for example, when a hazard is introduced into the pipeline or when waiting for memory accesses to complete. An intentional idle may be introduced to avoid a hazard being introduced into the pipeline. A hazard may be a structural hazard (such as when the hardware cannot support a combination of instructions that are to be executed in parallel), a data hazard (such as when an instruction depends on the results of an instruction still in the processor pipeline) and a control hazard (such as when a decision needs to be made based on the result of an instruction while other instructions are executing). One example of a hazard is when the instruction pipeline needs to be flushed following a branch misprediction.

The time taken for useful work to be completed can be calculated using instructions per second (IPS) and subsequently converted into a clock frequency that the processor can request to operate at. IPS may be obtained using a software-based request. To account for the fact that non-useful work is also likely to be performed, the IPS value is converted into a clock frequency request value using a "worst-case" conversion factor. The clock frequency request value is provided to a control system in the computer system for setting the frequency of the clock signal.

SUMMARY

One aspect of the disclosure provides a computer system. In one embodiment, the computer system comprises a clock generator, at least one processor, and a clock frequency controller. The clock generator is configured to provide a clock signal at a clock frequency. The at least one processor is configured to receive the clock signal and to operate at a speed dependent on the clock frequency. The clock frequency controller is configured to receive efficiency information indicating a current efficiency of the at least one processor. The clock frequency controller is further configured to receive a request from the processor for a target number of processor instructions to be handled in a particular time period. The clock frequency controller is further configured to output a frequency control signal to the clock generator for controlling the clock frequency in dependence thereon.

Another aspect of the disclosure provides a method. In one embodiment, the method comprises generating, at a clock generator, a clock signal at a clock frequency and receiving the clock signal at a processor and operating the processor at a speed that is dependent on the clock frequency. The method further comprises receiving, at clock control logic, efficiency information from the processor indicating an efficiency of the processor during a time period. The method further comprises receiving, at a clock frequency controller, a request from the processor for a target number of processor instructions to be handled in the time period. The method further comprises outputting a frequency control signal from the clock control logic to the clock generator for controlling the clock frequency and adjusting the clock frequency in dependence on the frequency control signal.

BRIEF DESCRIPTION OF THE DRAWINGS

Reference is now made to the following descriptions taken in conjunction with the accompanying drawings, in which.

DETAILED DESCRIPTION

The "worst case" conversion factor is generally too large for much of the execution time of the processor. In cases where the clock frequency is dependent on a voltage supplied to the clock generator (such as where the clock generator is a digital frequency locked loop (DFLL) or otherwise comprises a voltage controlled oscillator), this can affect the voltage drain on the power supply. In this case, the worst case conversion factor will result in the frequency of the clock signal being higher than necessary for a large proportion of the time. This means that the clock generator will draw a higher than necessary voltage from the power supply for a large proportion of the time, which causes unnecessary power wastage. This is particularly disadvantageous when the power supply is limited, for example, when the power supply is a battery. The inventors have identified that it would be desirable to improve the applied "worst case" conversion factor. The inventors have further identified that there are a number of reasons why it is difficult to determine the amount of non-useful work cycles. For example, processors have different memory access latencies on different platforms or in different execution conditions (e.g., where there is a different level of competing traffic in a shared memory system). To this effect, there is provided an integrated software/hardware system for controlling the frequency at which a processor clock operates.

The following disclosure relates to a computer system in which the clock frequency of a processor can be controlled in a reactive manner related to the operation of the computer system. The processor is configured to receive a clock signal having a frequency that is adjustable in dependence on a target number of instructions to be executed in a predetermined time period and on efficiency information provided by the processor. The efficiency information is indicative of the efficiency of the processor during a particular time. The aim is: to know the efficiency of a processor to allow a particular clock frequency to be set that will deliver a certain number of instructions during a certain period. The target number of instructions can be a rate (e.g., MIPS), or in terms of expected work done in a certain time period, or by a certain deadline.

Figure 4:
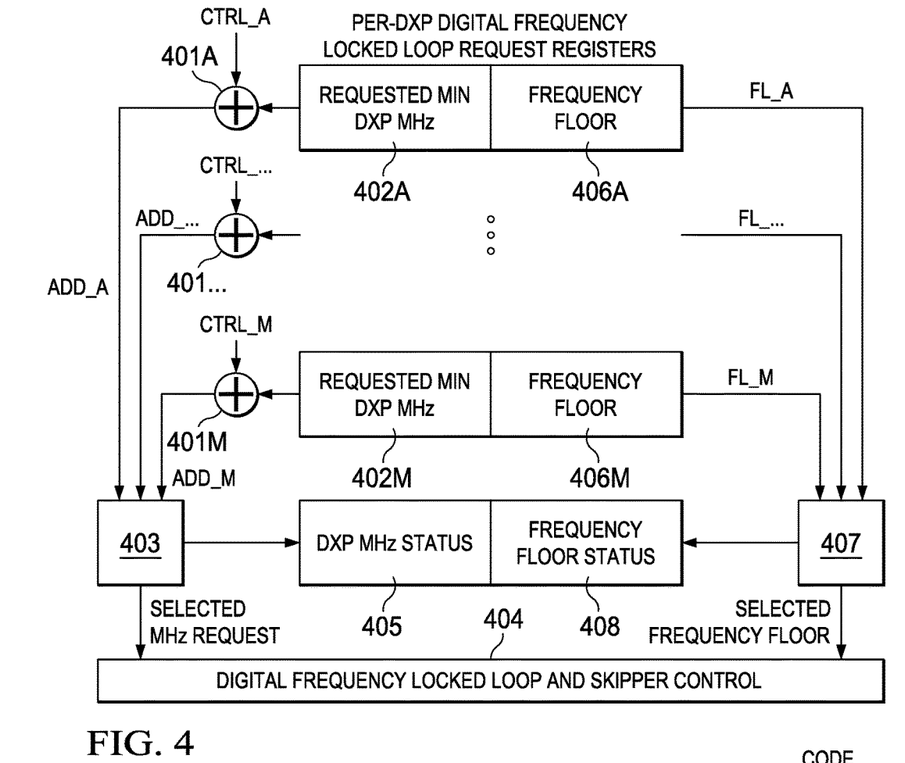
FIG. 4 shows a block diagram for controlling a clock generator.
Figure 5:
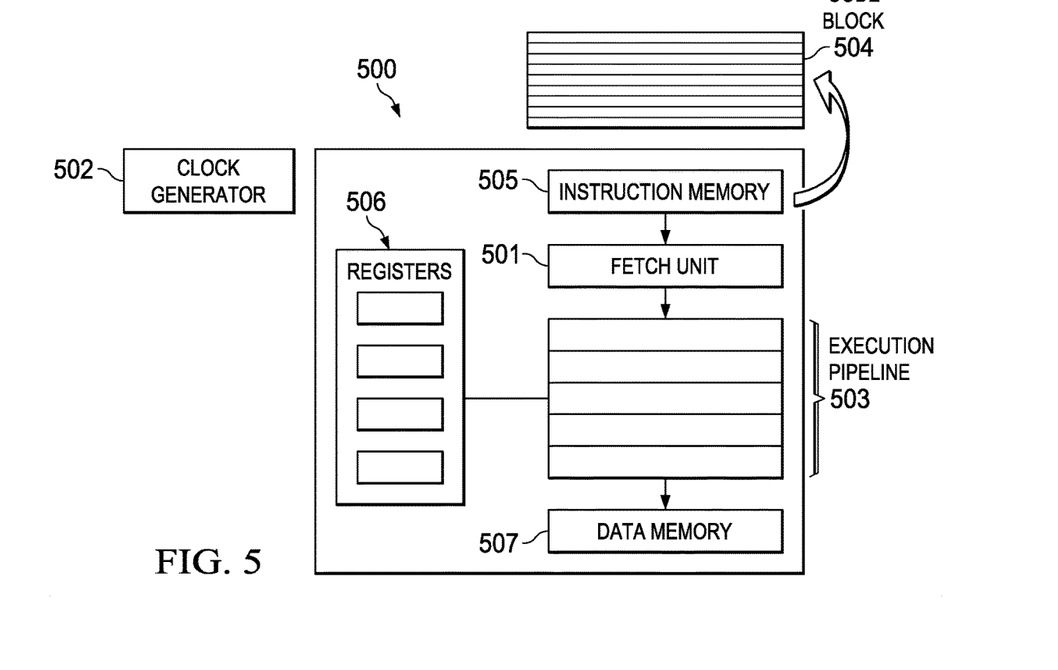
FIG. 5 shows a typical processor architecture.

To provide context in the following, a well-known architecture for a processor 500 is illustrated in FIG. 5. However, the subsequently described embodiments of FIGS. 1A to 4 are not limited to this particular processor architecture. The processor 500 comprises a fetch unit 501, an execution pipeline 503, instruction memory 505, registers 506, and data memory 507. Although depicted as separate entities, it is understood to a skilled person that instruction memory 505 and data memory 507 may be implemented using the same memory block. Reference numeral 504 denotes a code block representing an instruction sequence in memory 505.

The illustrated execution pipeline 503 comprises five stages for completing the execution of an instruction cycle. The time taken to perform each stage in the execution pipeline 503 is determined by a clock $\phi$ from the clock generator 502. The clock generator 502 provides a clock $\phi$ which defines a clock cycle, which is the time taken from one clock "tick" to the next clock tick (i.e., the time taken from one logical high (or low) of the clock generator to the next logical high (or low) of the clock generator). Each stage is performed in a clock cycle. As there are five stages in the execution pipeline 503, up to five instructions can be loaded into the execution pipeline at any one time, i.e., one instruction per stage. Once the execution pipeline 503 is fully loaded, each clock tick will mark the completion of a single instruction (assuming there are no hazards).

It is understood that although only five processor stages are outlined above, fewer or more stages may be implemented in the execution pipeline 503. For example, an additional stage may be to evaluate the addresses of the stored operands.

It is understood in the art that to increase the speed with which instructions are executed by the processor, the frequency of the clock generator should increase. For certain types of clock generators, such as those comprising voltage controlled oscillators, increasing the frequency increases the amount of voltage that needs to be supplied to that clock generator, which increases the amount of power used by the clock and increases the drain on the power supply.

The frequency of the clock signal (and hence the speed of the processor) is set following a request made by the processor. The processor requests a floor frequency (which is the minimum frequency required by the processor) and requests a preferred clock frequency that corresponds to the number of instructions per second (IPS) that the processor anticipates executing during a subsequent time period. The clock generator uses this information to set the frequency of the clock signal. As mentioned above and further explained below, it is conventional to overestimate the preferred clock frequency by a set conversion factor (margin) in order to ensure all of the instructions may be completed in the subsequent time period.

It is important when executing instruction sequences, such as that illustrated by reference numeral 504, that there is a degree of predictability about the amount of time it will take for a particular instruction sequence or code block to be executed. Although the number of instructions in a code block can be known, and therefore in principle the length of time for execution can be known, in fact for the reasons specified in the background section above, it is not always possible to use every "tick" of the clock in useful work. In order therefore to complete a certain instruction sequence in a certain maximum amount of time, the frequency of the clock needs to be increased, possibility unnecessarily. That is, often the code sequence will complete in a time less than that maximum amount of time and could have completed in the maximum time at a slower clock. The present disclosure discusses a mechanism for minimizing unnecessary margins in setting clock frequencies.

In on type of advanced Active Power Manager (APM), client software may request a processor clock frequency, and request a new processor clock frequency at any later time. The APM is implemented as software that can define (and configure) the operating parameters of a processor clock, such as clock frequency and conversion factors. The APM also configures operating parameters of other hardware components, such as an efficiency determination unit. In a particular example, where the clock generator is a digital frequency locked loop (DFLL), the APM determines a conversion factor for converting a requested clock frequency into a voltage request from the power source. This conversion factor is based on information regarding the efficiency of the processor served by the clock. The conversion factor is configured into the DFLL so that the DFLL will, on receiving a requested clock frequency from the processor, convert the requested clock frequency into a required voltage using the conversion factor. This conversion is executed using hardware in the DFLL. The required voltage indication is provided to the power source by the DFLL. The power source is configured to use the required voltage indication to adjust the voltage supplied to the DFLL.

The APM may have a repeating frequency pattern for processing part of a periodic workload faster than the rest. One or more segments of the repeating pattern can be adapted to adapt to a variable amount of work in part of the workload. The APM can also be modified to vary memory frequency, control the DFLL, etc. The aim is to allow the APM software to control the frequency dynamically. However, the software control alone, while useful, does not react quickly enough in some scenarios.

The present disclosure predominantly concerns a modification to this type of APM and is known herein as a reactive APM context. In the reactive APM context, a clock generator, such as a DFLL, is controlled to deliver a reactive frequency. As a first distinction from the above discussed APM, the client software (i.e., the reactive APM) does not request a frequency (MHz value) per processor (CPU). Instead, the client software receives an indication of the number of instructions that need to be completed in a particular time period. In one embodiment, the indication is provided in the form of an average number of instructions to be completed per second, such as Mega-instructions-per-second (MIPS). In another embodiment, the indication is provided in the form of a total number of instructions to be executed in a particular time period, in the form of work done. Software and hardware operate in conjunction as described herein to adapt the frequency and other parameters to execute the requested number of instructions in the specified time period. This allows a processor to adapt to accommodate for a change in its efficiency, for example changing cache misrates and latencies. Frequent sampling of the delivered results (of the order of tens of microseconds) to determine an efficiency of the processor together with preprogramed hardware reactivity allows for the clock frequency to be controlled in dependence thereon.

A control loop design incorporating these elements allows power saving to be balanced against the probability of a processor becoming too far behind its workload. If a delivered frequency is never allowed to drop below a floor, it is possible to guarantee an average frequency as a function of the floor frequency, maximum frequency and window size. The window size is the period between samples of the delivered results. The frequency may be measured in Megahertz (MHz).

A component of the system described in the following is an efficiency determination module, which acts as a clock frequency controller in hardware. The efficiency determination module takes in both efficiency indicators from at least one processor and an indication of the intended cycles to be performed during a subsequent time period and determines a clock speed/frequency request in dependence thereon. The efficiency indicators provide a measure of the efficiency of the at least one processor. The speed request delta is referred to herein as a "control signal" and is indicative of a requested clock speed of the processor needed to execute the intended cycles. The efficiency indicators are used by either the efficiency determination module, and/or some other control logic (such as the APM via the conversion factor), to determine whether or not the frequency of the clock signal that is currently being supplied to the processor needs to be increased or decreased. This increase or decrease can be implemented by a fast reactive hardware loop (for example the DFLL) without changing the software control. If necessary, the software control can be changed on a less reactive basis to manage a different context.

The efficiency determination module is software configurable by the APM. That is, it can be loaded with different software configurations to implement different policies, to allow the relationship between the efficiency information and the generated clock frequency to be varied depending on the context. Reprogramming the efficiency determination module in this way allows for an efficient alteration of different policies, whilst controlling the frequency of the clock signal based on the control signal in hardware provides a very rapid real-time response for whatever policy is implemented. The efficiency determination module can implement a "help" function if the present policy results in inadequate or unstable clock control. In that case, the efficiency determination module can issue a request to download a new software configuration to implement a different policy. The downloadable software configurations can be stored in the memory, or in any suitable memory on the device. The downloadable software configurations form at least part of the APM.

Figure 1A:
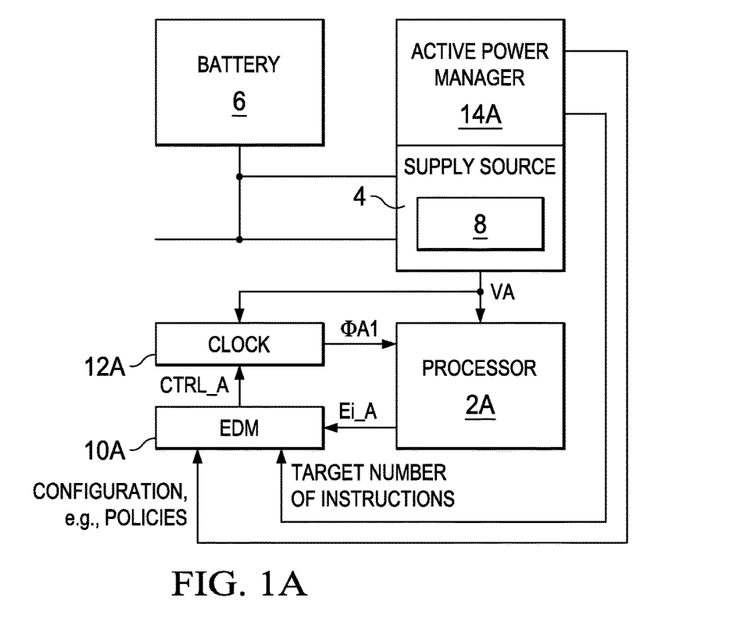
FIG. 1A is a schematic diagram of a single processor computer system.

FIG. 1A is a schematic block diagram of a battery powered computer system. The computer system may, for example, take the form of a laptop computer, desktop computer, tablet style computer or mobile phone (which may be referred to as a "smart phone"). The computer system comprises a battery 6 configured to provide an operating voltage to a supply system 4. The supply system 4 comprises a power management controller 8 for controlling the power supplied to various components. One of those components is a processor 2A, to which supply system 4 supplies a voltage VA. The voltage VA is also supplied to a clock generator 12A. The clock generator 12A outputs a clock signal ϕA1. The clock signal ϕA1 has a frequency CLK_FRQ_A. The clock signal ϕA1 is provided to a processor 2A. The processor 2A provides efficiency information Ei_A to an efficiency determination module 10A. The efficiency determination module 10A is also provided with the requested instructions of the processor (on either an average per-second basis or on a total-time basis) from the APM 14A. The APM 14A also provides the efficiency determination module 10A with relevant policy information, such as operational parameters, for generating the control signal CTRL_A. The efficiency determination module 10A provides control signal CTRL_A to clock generator 12A. The clock generator 12A is configured to use the control signal CTRL_A to set the frequency of the clock.

In operation, the clock generator 12A generates clock signal ϕA1, which it outputs to the processor 12A. The clock signal ϕA1 has a frequency CLK_FRQ_A whose value depends on the magnitude of the voltage VA supplied to the clock generator 12A. A high supply voltage VA corresponds to a high frequency CLK_FRQ_A. A low supply voltage VA corresponds to a low frequency CLK_FRQ_A.

The processor 2A receives the clock signal ϕA1 and operates at the same frequency as the clock signal. In other words, each stage of the pipeline of the processor 2A is performed with a frequency of CLK_FRQ. The processor 2A executes instructions in cycles and supplies efficiency information Ei_A to the efficiency determination module 10A. The efficiency determination module 10A is also provided with (or otherwise configured with) a target number of instructions (as described above). The efficiency information Ei_A is indicative of the efficiency of the processor 2A at performing useful work during a respective time period. The efficiency may be expressed as the ratio of cycles spend performing useful work in a time period to the total number of cycles completed during that time period by the processor 2A. Depending on the configuration of the system, the time period is between 10 μs and 100 μs. In this context, useful work covers cycles in which the processor 2A is executing instructions and cycles during which the processor 2A is intentionally idle. The target number of instructions is the number of instructions that the processor is expected to execute in the subsequent time period. The time period may be one second (e.g., the target number of instructions may be provided in MIPS) or the time period may be other than one second (e.g., the target number of instructions may be provided along with a time period for completing those instructions). The efficiency determination module 10A uses the efficiency information Ei_A and the target number of instructions to generate a control signal CTRL_A. The control signal CTRL_A is generated based on a particular policy provided by the APM. The control signal CTRL_A is provided to the clock generator 12A and is used by the clock generator 12A to directly modulate the frequency of the clock signal within a range of frequencies permitted by the voltage VA. For example, the clock generator 12A converts the control signal from a requested frequency into a required voltage to be requested from the power supply 4A. The power supply 4A adjusts the voltage supplied to the processor 2A and the clock generator 12A in dependence on the received requested voltage from the clock generator 12A. The clock generator 12A can affect the voltage supplied to itself in dependence on the received control signal CTRL_A either directly or indirectly. Assuming the case of the same number of instructions being requested for each of a plurality of time periods (e.g., there the target instructions are provided in MIPs), if the processor is less efficient during a particular time period than in the immediately preceding time period, then the efficiency determination module 10A outputs a control signal CTRL_A indicating that the clock signal frequency CLK_FRQ_A should be increased. However, if the processor 2A is more efficient during a particular time period than in the immediately preceding time period, then the efficiency determination module 10A outputs a control signal CTRL_A indicating that the clock signal frequency CLK_FRQ_A should be decreased.

The clock generator can be a digital frequency locked loop (DFLL) of the type described, for example, in WO 2011/104242 where an applied voltage (e.g., VA) sets a steady state output frequency, which can however be varied by an internal control signal, while the externally applied voltage remains at a set point (steady state).

Figure 1B:
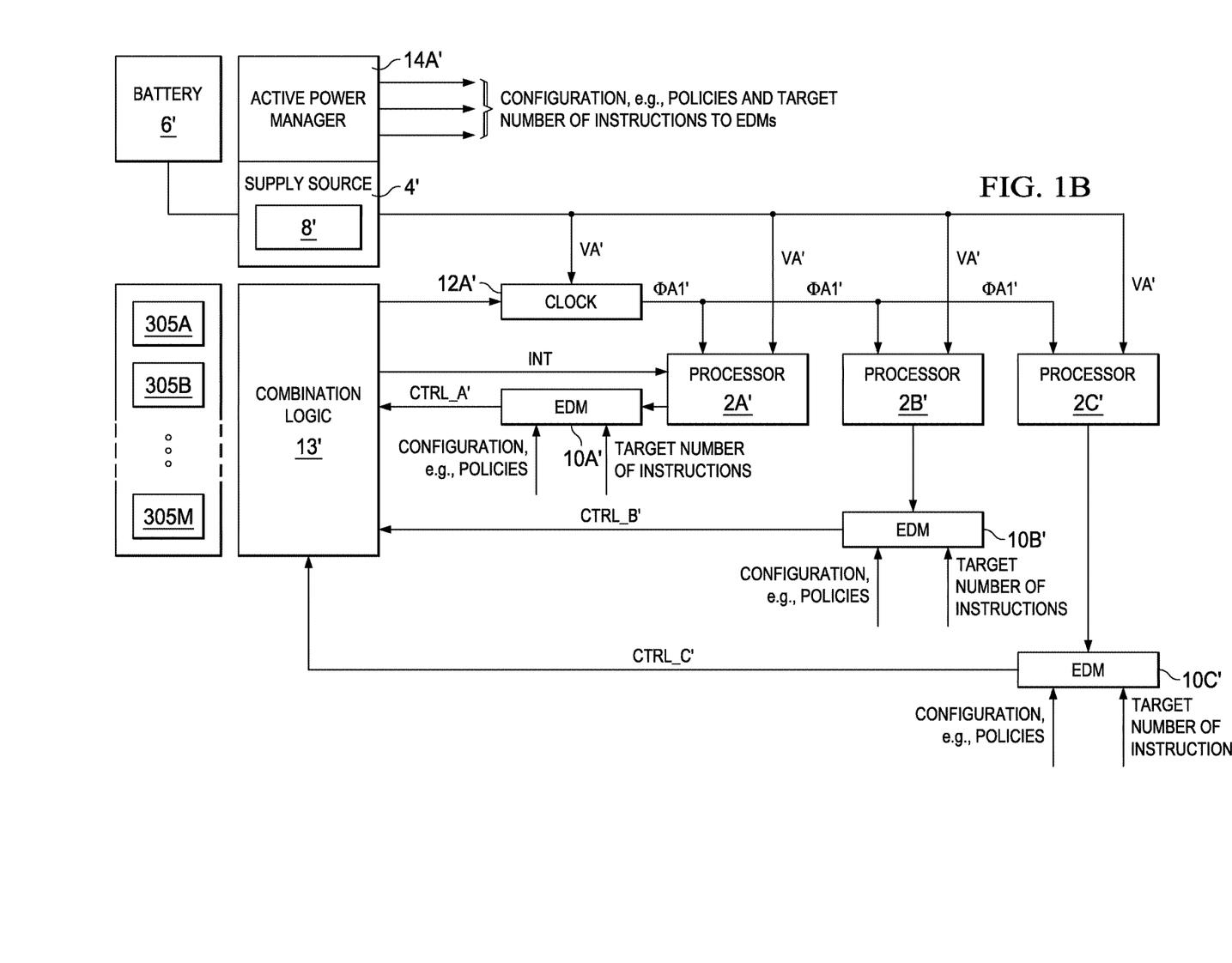
FIG. 1B is a schematic diagram of a multiple processor computer system.

FIG. 1B illustrates a context of multiprocessors which share a clock domain and voltage domain. Each processor 2A', 2B', 2C' is associated with a respective efficiency determination module 10A', 10B', 10C'. The output values from each efficiency determination module are supplied to the DFLL 12A' and directly modulate the DFLL speed requests in hardware. The steady state speed request for the DFLL is supplied from the supply PMIC 4' in the form of a desired clock indicator. This can take the form of a supply voltage when the DFLL is implemented with a DVCO.

The outputs from each of the EDMs are supplied to combination logic 13', which has an output to the DFLL, rather than to the DFLL itself. The combination logic 13' can also operate to generate CPU interrupts (one of which INT is shown in FIG. 1B). The CPU interrupts can denote a situation where the efficiency determination module outputs have indicated a situation that cannot be handled by direct hardware modulation of the clock frequencies, but where something more overarching is required. In this case, different software policies can be downloaded into the EDMs or some other software driven steps can be taken to rectify the situation. However, software driven reactivity is not practical in 10/100 microsecond timescales. Nevertheless, software reactivity in conjunction with direct hardware modulation provides an extremely effective approach to efficient regulation of clock frequency.

The combination logic 13' modulates output values received from the efficiency determination modules as described in more detail later. The DFLL 12A' is associated with "requested speed" registers 402A to 402M which are programmed to reflect a minimum allowed clock frequency (see FIG. 4).

The speed requests are updated every efficiency determination period. The combination logic 13' takes in all of the outputs from the efficiency determination modules and combines them to control a loop target of the DFLL 12A' and the cycle skipper. The cycle skipper is a module configured to "skip" or otherwise omit clock pulses for generating a clock frequency that is lower than the actual clock frequency generated by the supplied voltage. The cycle skipper may thus provide a fine grain tuning to the clock frequency output by the clock generator.

In the present example, where one clock signal is input to multiple processors, the output parameters from one efficiency determination module of a processor may not have any effect on the DFLL if the output parameters from at least one of the other efficiency determination modules of the other processors indicate that a higher clock frequency is requested. A DFLL status shows a currently selected processor frequency (CPU MHz) and frequency floor. This is described in more detail later.

There are multiple ways in which to determine the efficiency of the processor 2A at performing useful work.

One way is to count the "intended" cycles of the processor 2A. In this context, an "intended" cycle is either a signal in which an instruction is executed or a cycle that is intentionally left idle. The skilled person is familiar with signals that can be used to count these signals. A count of the total number of processor cycles is also made. The raw data counts from these counters can be used to determine an efficiency of the processor 2A by dividing the number of "intended cycles" in a time period by the total number of processor cycles made during that time period. This gives a fractional indication of the efficiency of the processor 2A. In this case, the fractional indication would span between 0 and 1, with 1 indicating a perfectly efficient processor 2A and 0 indicating a perfectly inefficient processor 2A.

Figure 2:
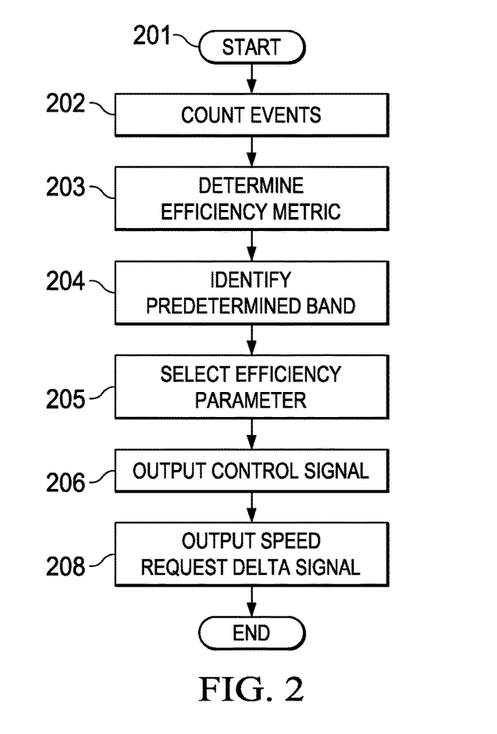
FIG. 2 shows an example process for adjusting a clock frequency signal in a computer system.
Figure 3:
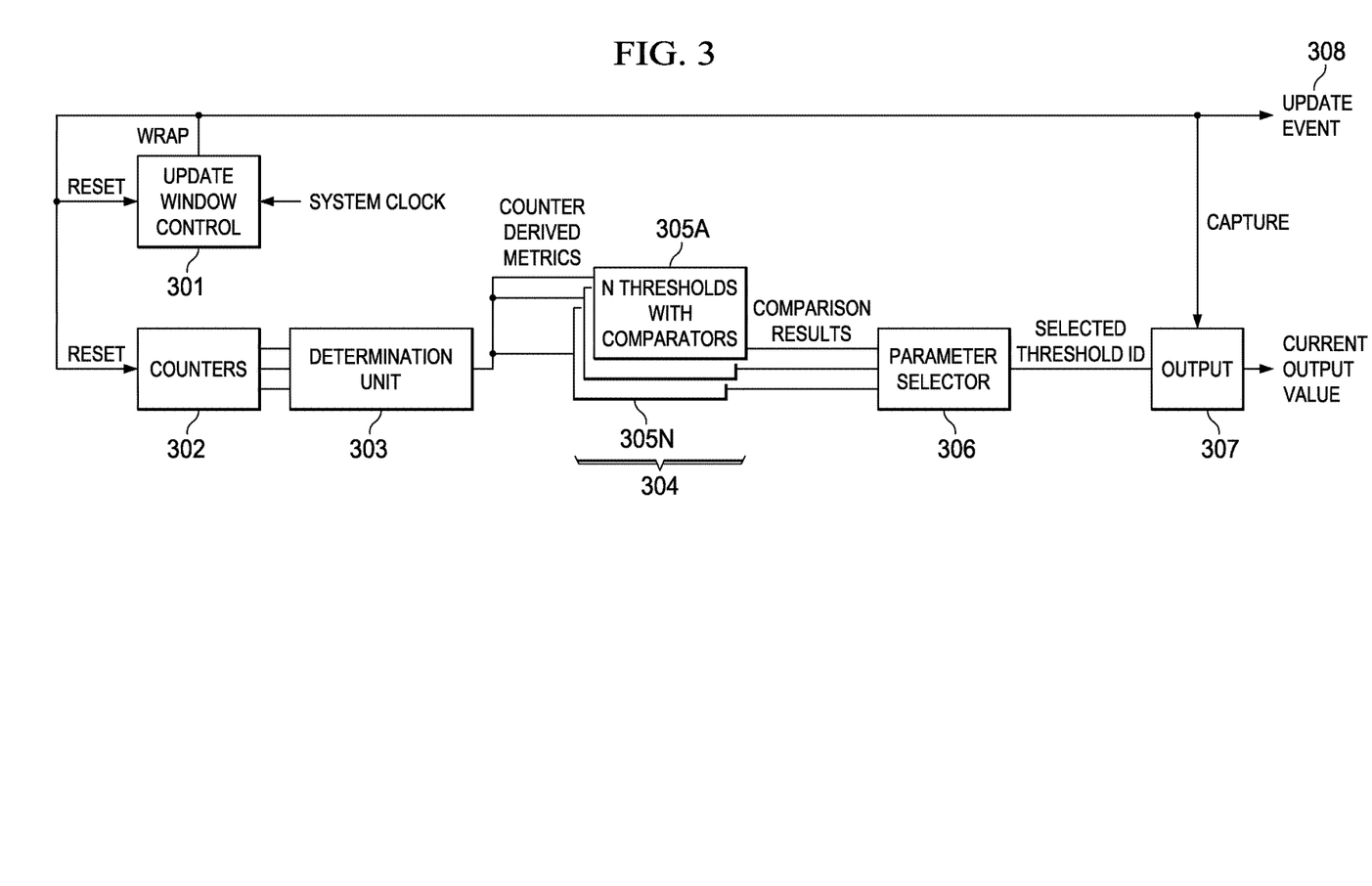
FIG. 3 shows a block diagram for selecting an efficiency parameter.

An example is illustrated in FIGS. 2 and 3. FIG. 2 illustrates processes performed by the processor 2A and the efficiency determination module 10A. Both the processor 2A and the efficiency determination module 10A may be comprised within the same integrated circuit and/or within the same housing. To achieve software configurability the efficiency determination module is implemented using software executed on a processor (which may be processor 2A or another processor).

The process starts at 201.

The EDM 10A receives a request of the number of instructions to be executed by processor 2A in a subsequent time period. This number of instructions is converted, as accurately as possible, into an anticipated clock frequency request. In this context, the term "as accurately as possible" is intended to convey that a minimum conversion factor is applied to number of instructions in order to convert the number of instructions magnitude into an anticipated clock frequency request magnitude. The anticipated clock frequency request (or "speed request") is provided to the clock generator and is used by the clock generator to deliver the anticipated clock frequency.

At 202, the processor 2A counts "interesting" events. Examples of interesting events include all processor cycles, non-idle processor cycles, processor cycles in which instructions are executed, etc. The different types of interesting events may be counted by the processor 2A using respective counters. Some interesting events may be grouped together under a single classification and counted using a single counter.

At 203, the raw data from the counters is passed to a determination unit and the counters are reset for collecting data during a subsequent time period. The determination unit determines an efficiency metric for the received raw data. The efficiency metric provides a relative indication of the efficiency of the processor 2A based on a scale employed with the computer system.

At 204, the efficiency metric is passed to a comparison unit. The comparison unit identifies a single predetermined band of efficiencies within which the efficiency metric lies. A predetermined band spans a contiguous range of efficiencies (based on the same scale as the efficiency metric). There are a plurality of predetermined bands, each being associated with a particular efficiency parameter and non-overlapping in range with other predetermined bands. To identify the single predetermined band, the comparison unit compares the efficiency metric to N thresholds. Use of the predetermined bands is advantageous to mitigate against jitter of the clock signal frequency CLK_FRQ in response to only a small change in the efficiency of the processor.

At 205, the efficiency parameter associated with the single predetermined band is selected. A hysteresis mechanism may be applied to bias the selection of the efficiency parameter. This is useful, for example, for causing the processor 2A to respond quickly to decreases in the efficiency of the processor 2A and to respond less quickly to improvements in the efficiency of the processor 2A. The hysteresis is implemented by downloading a software policy that affects how the efficiency parameter changes the output parameter of the efficiency determination modules.

At 206, the selected efficiency parameter is output as a speed request signal.

At 208, the speed request signal is supplied to the clock generator 12A to directly modulate, in hardware, the clock frequency output by the clock generator 12A. This is shown as a control input CTRL_A in FIG. 1.

The process ends at 210.

An example of hardware configured to execute at least part of the process of FIG. 2 is depicted in FIG. 3. An update window control unit 301 is arranged to receive reset signal RES_1 and the current clock value CLK. In parallel, counters 302 are configured to receive the reset signal RES_1 and to output raw counter values to a determination unit 303. The determination unit 303 uses these raw counter values to determine an efficiency metric. The efficiency metric is subsequently provided to a comparison unit 304 comprising N threshold determination devices 305A to 305N. The threshold determination devices 305A to 305N comprise comparators for determining whether an efficiency metric lies within a particular predetermined band. Each predetermined band is associated with a respective efficiency parameter. The efficiency parameter is indicative of an efficiency of the processor. The comparison results comp_1 to comp_N are output to parameter selector 306 which selects the efficiency parameter corresponding to the predetermined band within which the efficiency metric lies. An indication of the selected efficiency parameter Eff_ID is passed to an output unit 307. The output unit 307 outputs the efficiency parameter Eff_ID as a signal. The output efficiency parameter is combined with an anticipated clock frequency request value to form an actual clock frequency request. The actual clock frequency request is indicative of the actual clock frequency request to the clock generator 12A. The output unit 307 is further arranged to receive a capture command CPT from a command line 308. The capture command CPT indicates to the output unit when a new signal by the efficiency determination module should be output. The time covering the period between successive efficiency parameter outputs is governed using the update window control 301 system and the system clock signal input to it.

In the case of a system in which there are multiple processors, each having their own efficiency determination module, the output from each of the efficiency determination modules may be combined in various ways.

An example system depicting how the efficiency parameters can be used to modulate the clock frequency is shown in FIG. 4. This example system corresponds to the embodiment depicted in FIG. 1B, where output parameters from multiple efficiency determination modules are modulated in the combination logic and output to the clock generator 12A'. In this example system, there are M processors. Each processor receives a clock signal from the clock generator 12A' and outputs efficiency information to a respective efficiency determination module. The M efficiency determination modules each determine an efficiency parameter, as described above in relation to FIGS. 2 and 3. The M efficiency parameters are input into respective adders 401A to 401M. Each of M efficiency parameters is indicative of the efficiency of that respective processor. The adders 401A to 401M also receive a respective minimum requested processor frequency in MHz from frequency request registers 402A to 402M. Each mixer 401A to 401M outputs a respective added signal ADD_A to ADD_M, which are received by frequency determination device 403. The frequency determination device 403 forms part of the combination logic. The added signal ADD_A corresponds to the control signal CTRL_A' output by the efficiency determination module 10A' in FIG. 1B. Similarly, the added signal ADD_B would correspond to the control signal CTRL_B' output by the efficiency determination module 10B'. The frequency determination device subsequently outputs a signal to feedback loop 404 and frequency generator register 405.

Each processor also requests a respective frequency floor to frequency floor registers 406A to 406M. Each frequency floor register 406A to 406M outputs a respective floor signal FL_A to FL_M to a frequency floor determination device 407. The floor determination device 407 forms part of the combination logic. The frequency floor determination device 407 subsequently outputs a signal to the feedback loop 404 and a frequency floor status register 408.

In operation, each processor is configured to store a frequency floor value in its respective registers 406A to 406M. The frequency floor values are all provided to a frequency floor determination device 407, which determines the maximum requested frequency floor. This maximum requested frequency floor value is stored in the frequency floor status register 408. The frequency floor status register 408 contains a value that sets the frequency floor of the digital frequency locked loop.

The values stored in the frequency generator register 405 and the frequency floor status register are used to set the frequency CLK_FRQ_A of the clock signal of the clock generator 12A. The floor frequency and clock frequency selected by determination devices 403, 407 are also provided to the feedback loop 404. The feedback loop 404 forms part of the feedback loop of the DFLL. The values input thereto are used to control the DFLL loop target and cycle skipper.

The speed request is updated every update period. The update period may be periodic or aperiodic. For digital frequency loops, it is advantageous to set the update period between 10 µs and 100 µs inclusive.

The above described embodiments can reduce the power consumption of the computer system. The control signal CTRL_A provided by efficiency determination module 10A is variable and indicative of a current or recent operating efficiency of a efficiency determination modules' 10A respective processor. Control signal CTRL_A can thus be used by the clock generator 12A to adjust the supply voltage VA drawn by the clock generator 12 and consequently the frequency of the clock signal CLK_FRQ_A. Thus the frequency of the clock signal CLK_FRQ is adjusted in dependence on how efficient the processor 2A is. As the processor 2A operates processing cycles at the same frequency as the frequency of the clock signal CLK_FRQ, control signal CTRL_A can also be said to adjust the frequency of processor 2A.

The above described embodiments are useful for improving the conversion factor applied when converting the number of instructions into a clock frequency. Rather than using the "worst case" value, any conversion factor can be adjusted in dependence on the efficiency parameters determined during a recent time period. This means that the conversion factor can be reactive to recent system conditions. This reduces the likelihood of a clock generator operating at an unnecessarily high speed for a relatively long time period. Advantageously, instead of using a "worst case" conversion factor, a "best case" conversion factor, adjusted in dependence on the efficiency parameter is used instead. A "best case" conversion factor is a conversion factor that closely corresponds to a true conversion between instructions per second and clock frequency. The clock frequency resulting from the applied conversion factor is adjusted in dependence on the efficiency information Ei_A received by efficiency determination module 10A to reflect the current operating efficiency of the processor 2A. The more efficient the processor, the smaller the increase to the frequency arising from the best case conversion factor. Conversely, the less efficient the processor, the bigger the increase to the frequency arising from the best case conversion factor.

An alternative embodiment involving multiple processors (alternative to the embodiment shown in FIG. 1B), is to have each clock generator-processor pair receive a respective voltage supply from the power supply 4/4'. In this case, as only one processor would be providing information a requested frequency signal to the clock generator via its efficiency determination module, there is no need for the combination logic 13'. In other words, such a system would be substantially as though multiple systems of the embodiment of FIG. 1A were implemented in parallel, each configured to receive a respective voltage supply from the power supply 4.

It is understood that the voltages supplied to the different clock generator-processor pairs could be the same as each other, different, or be a mixture of the two.

It is also understood that systems may exist that are a hybrid of FIGS. 1A and 1B (i.e., some clock generator(s) serving only one processor whilst other clock generator(s) serve multiple processors).

The processor can be provided on a common integrated circuit or as separate integrated circuits within a common housing.

Although references have been made above to a battery operated power supply, it is understood that the power supply may be any power supply, such as a mains power supply.

In the above, the clock frequency controller of a particular embodiment can be said to comprise the efficiency determination modules and any combination logic for modulating the output of the efficiency determination modules.

Further, the speed request (CTRL_A, the clock frequency request) output by the clock frequency controller to the clock generator 12A can be a delta indicating a clock speed with reference to, for example, a reference clock speed or a current clock speed.

The frequency determination device may be implemented using software.

It is understood that although the above described embodiments depict the APM 14, 14' as an independent entity, the APM 14, 14' represents software that can be executed on any suitable medium, such as the processors depicted in FIGS. 1A and 1B.

Further, the efficiency modules described above have been described as determining a clock frequency requested by the processor in dependence on the efficiency of a processor in a preceding time period and the anticipated number of instructions per second (or equivalent) that it is desired to execute in a future time period. However, other factors may be taken into consideration by the efficiency modules when determining whether the frequency of the clock should be increased or decreased.

The above described embodiments depict the efficiency determination module as a separate entity to the processor and the clock generator. However, it is understood that the functionality of the efficiency determination module may be implemented in the processor, or in the clock generator or in a combination of the two. In any case, it is preferred that the efficiency determination module receive hardware sampled efficiency statistics from the processor and to use those efficiency statistics to determine an efficiency parameter. This efficiency parameter is provided as a control signal to the clock generator for controlling the minimum requested frequency of the clock signal.

It is also noted that, in the above systems, the processor could be programmed to carry on sampling efficiency metrics for a short period of time (such as a millisecond) without any errors or hazards being encountered by the processor in the event that the control signals are not being correctly generated by the efficiency determination modules. In this case, if the problem is not resolved within a predetermined time frame (such as 1 millisecond), the combination logic 13' is configured to issue an interrupt to the processor 2A'. On receipt of this interrupt, the processor may then attempt to correct itself, such as by downloading a new policy mechanism as previously described.

Although described as separate devices in the above, the efficiency determination module 10 may reside within processing functionality of the processor 2. Alternatively, the efficiency determination module may be comprised within some other feedback mechanism configured to control the frequency of the clock 12.

The supply systems 4, 4' may be a power management integrated circuit (PMIC).

Although references have been made in the above to IPS, it is noted that the IPS values may be substituted by CPI values. The same principles outlined above in relation to converting IPS into a requested clock frequency also apply in relation to converting CPI into a requested clock frequency.

As mentioned above, in a baseline APM, client software requests that a processor operates at a particular frequency. Another frequency request (for the same or a different processor frequency) may be made at any later time. The frequency request can indicate a repeating frequency pattern for the clock frequency, such that the frequency of the processor varies in accordance with the defined frequency pattern. This allows different parts of a periodic workflow to be processed at different speeds. Further, the client software can be configured to adapt one or more segments of the repeating frequency pattern. The adaptation is made in response to a detection of a variable amount of work being performed in part of the workload. Further, the client software can be configured to vary the configuration of other parts of the processing architecture such as, for example, the memory frequency, a DFLL, etc. The client software (APM) can thus control the operating frequency of the processor directly in the baseline APM.

As mentioned above, in reactive APM, the client software requests MIPS (or similar) per CPU instead of a particular frequency (MHz). As disclosed above, platform software and hardware adapt the MHz and other parameters to provide the requested average MIPs. In this case, an objective is to adapt against changing cache misrates and latencies. By frequent sampling of the actual delivered MIPs (of the order of tens of microseconds) and by pre-programming the way in which hardware reacts to the sampling, a control loop for controlling the processor frequency can be set up. The control loop design can thus balance power saving against the probability of getting behind on the requested instructions by a predetermined percentage (x %) over the course of a time period (or sliding window) of length T. Also, by configuring the frequency delivered to the processor such that it never drops below a floor value, it is possible to guarantee an average frequency (MHz) as a function of the floor frequency, maximum frequency and window size.

This latter principle may also be extended to perform a specified amount of work by a specified time. In this case, the client software (APM) requests that a certain number of instructions be done by a given time (i.e., by a deadline). The client software sets the initial frequency to within a predetermined percentage of a "flat frequency". In other words, the APM initially configures the hardware to operate at a level that would have been requested for the baseline APM. At a later point in time, the hardware samples the work done, or otherwise determines the number of instructions performed in a known time, and can either reduce the clock frequency if more instructions have been executed than are necessary for the software's requested instructions, or can increase the clock frequency if less instructions have been executed than are necessary for the software's requested instructions (the hardware may also make no change if the expected number of instructions were executed in the predetermined time period). The control loop thus executed by the hardware configuration can make an optimization for the system between guaranteed work and power saving. A guaranteed performance can be delivered by starting each time period at a "flat frequency" of the baseline APM and later reducing to a frequency level such that the remaining work can be done in the remaining time (based on the same efficiency as the flat frequency, but running at a maximum frequency). This system has a similar aim to the reactive frequency (i.e., a control loop design can thus balance power saving against the probability of getting behind on the requested instructions by a predetermined percentage x % over the course of a time period or sliding window of length T). This system also allows the possibility of developing code incorporating work performance guarantees and can implement power saving during deployment in a controlled way.

While the invention has been shown and described with reference to particular embodiments, it will be understood to those skilled on the art that various changes in form and detail may be made without departing from the scope of the invention as defined by the appended claims.

Those skilled in the art to which this application relates will appreciate that other and further additions, deletions, substitutions and modifications may be made to the described embodiments.

What is claimed is:

1. A computer system comprising:
    a clock generator which provides a clock signal at a clock frequency;
    a plurality of processors, each processor receiving the clock signal and operating at a speed dependent on the clock frequency; and
    a plurality of clock frequency controllers, each being associated with a respective processor of the plurality of processor wherein, for each of a plurality of successive time periods, each controller:
        receives efficiency information from their associated processor indicating a current efficiency of that processor during a respective time period;
        receives a request from their associated processor for a target number of processor instructions to be handled in the respective time period; and
        subsequent to the respective time period, outputs a requested clock frequency control value for their associated processor to the clock generator for controlling the clock frequency in dependence thereon.

2. The computer system according to claim 1, wherein each of the plurality of clock frequency controllers comprises hardware configured to react in real time to changes in efficiency information.

3. The computer system according to claim 1, wherein each of the plurality of clock frequency controllers is programmable by software which implements a policy which determines a relationship between the efficiency information and the frequency control signal.

4. The computer system according to claim 3, comprising storage for holding a plurality of different software blocks for implementing different policies in each of the plurality of clock frequency controllers.

5. The computer system according to claim 1, wherein each of the plurality of clock frequency controllers adjusts the clock frequency by a larger amount if the efficiency information indicates that the efficiency of the processor has decreased than if the efficiency information indicates that the efficiency of the processor has increased.

6. The computer system according to claim 5, wherein the computer system further comprises a battery which supplies a voltage to the clock generator for generating the clock signal.

7. The computer system according to claim 5, further comprising a power supply controller which supplies a voltage indicating the anticipated clock frequency to the clock generator and the plurality of processors, wherein the clock generator:
    receives the voltage supply; and
    generates the clock signal at a frequency dependent on the received voltage.

8. The computer system according to claim 1, wherein each of the plurality of clock frequency controllers converts the received efficiency information into an efficiency parameter, the efficiency parameter being associated with a respective range of efficiencies of the associated processor.

9. The computer system according to claim 1, each of the processors further comprising a plurality of counters, each counter being associated with a respective event and counting an occurrence of their respective events during each respective time period; and wherein the efficiency information is based on count values from the plurality of counters.

10. The computer system according to claim 9, wherein each of the plurality of processors:
    converts the count values into an efficiency metric; and
    associates the efficiency metric with a single predetermined efficiency range from a plurality of predetermined efficiency ranges with a plurality of comparators,
    wherein all efficiency metrics lying within said predetermined efficiency range cause the same efficiency parameter to be output by each of the plurality of clock frequency controllers.

11. The computer system according to claim 10, wherein each predetermined efficiency range of the plurality of predetermined efficiency ranges is associated with a different efficiency parameter and selection of any of the predetermined efficiency ranges causes the associated efficiency parameter to be output by each of the plurality of clock frequency controllers.

12. The computer system according to claim 9, wherein the respective events are at least one of:
    the cycles during which instructions are executed,
    the cycles during which the processor is intentionally idle,
    the total number of processor cycles; and
    cycles during which a hazard has been detected in the instruction pipeline.

13. The computer system according to claim 1, further comprising combination logic, wherein each of the plurality of processors is configured to request a minimum clock frequency that their processor requires for operating; and the clock frequency controller for each processor:
- determines an efficiency parameter in dependence on the received efficiency information for each time period;
- sums the efficiency parameter with the minimum clock frequency; and
- outputs the summed result to the combination logic,
- wherein the combination logic is configured to determine a frequency at which to set the frequency of the clock signal by selecting the maximum of the summed results.

14. The computer system according to claim 1, wherein the clock generator is a digital frequency locked loop comprising a digital voltage controlled oscillator.

15. The computer system according to claim 14, wherein there is a first time period and a second time period immediately following the first time period, and wherein when the efficiency information associated with the second time period indicates that the efficiency of each of the plurality of processors has decreased between the first and second time periods, a second control signal associated with the second time period is output that indicates that the clock frequency should be increased relative to a first control signal associated with the first time period.

16. The computer system according to claim 1, wherein each of the plurality of clock frequency controllers outputs efficiency information indicative of the efficiency of its associated processor for each of a plurality of successive time periods.

17. The computer system according to claim 1, wherein the target number of instructions is provided in the form of an amount of work to be done by a certain time.

18. The computer system according to claim 1, wherein the target number of instructions is provided as a target rate of handling instructions.

19. A method comprising:
- generating, at a clock generator, a clock signal at a clock frequency;
- receiving the clock signal at a plurality of processors and operating the each of the plurality of processors at a speed that is dependent on the clock frequency;
- receiving, at clock control logic, efficiency information from each of the plurality of processors indicating an efficiency of each of the plurality of processors during a time period;
- receiving, at a clock frequency controller, a request from an associated processor of the plurality of processors for a target number of processor instructions to be handled in the time period;
- outputting a frequency control signal from the clock control logic to the clock generator for controlling the clock frequency; and
- adjusting the clock frequency in dependence on the frequency control signal.

* * * * *